Aug. 23, 1938.   S. J. STRID ET AL   2,127,966
LOADING DEVICE
Filed June 24, 1935   3 Sheets-Sheet 1
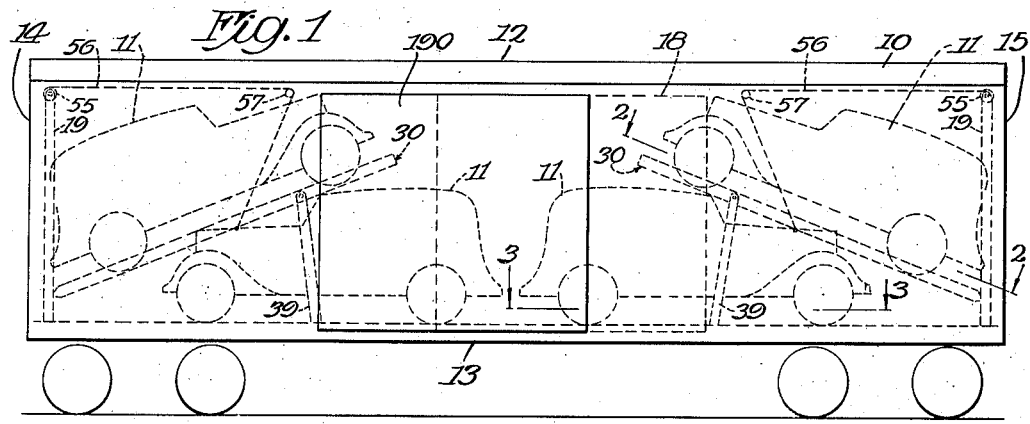
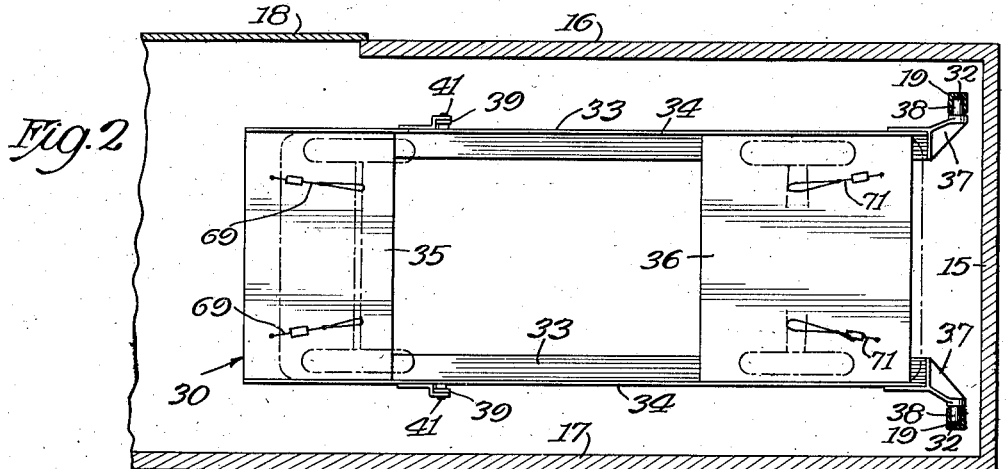
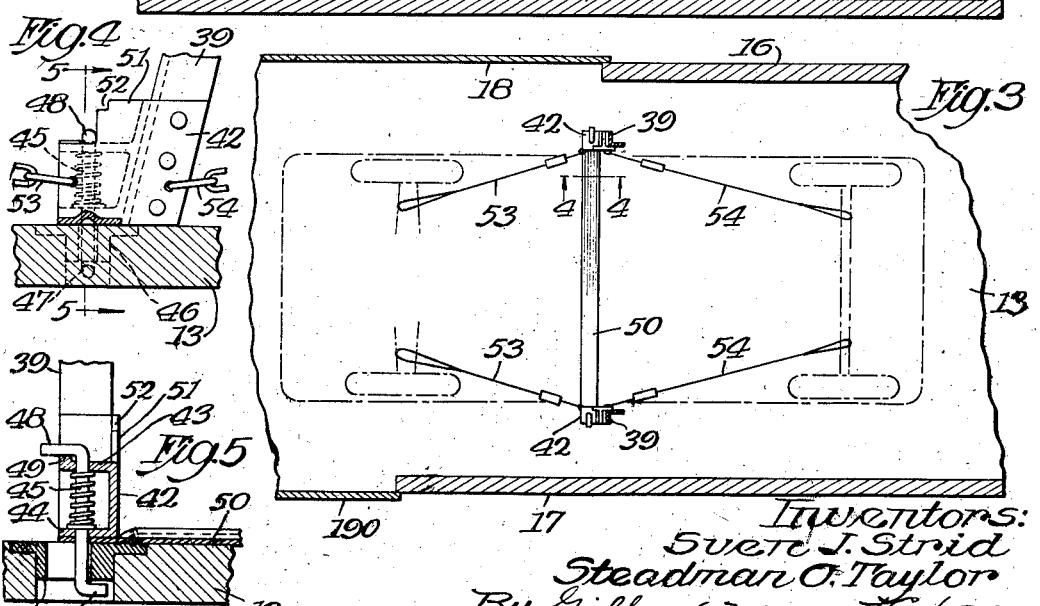
Inventors:
Sven J. Strid
Steadman O. Taylor
By Gilson, Mann & Co. Attys.

Aug. 23, 1938.  S. J. STRID ET AL  2,127,966
LOADING DEVICE
Filed June 24, 1935  3 Sheets-Sheet 2
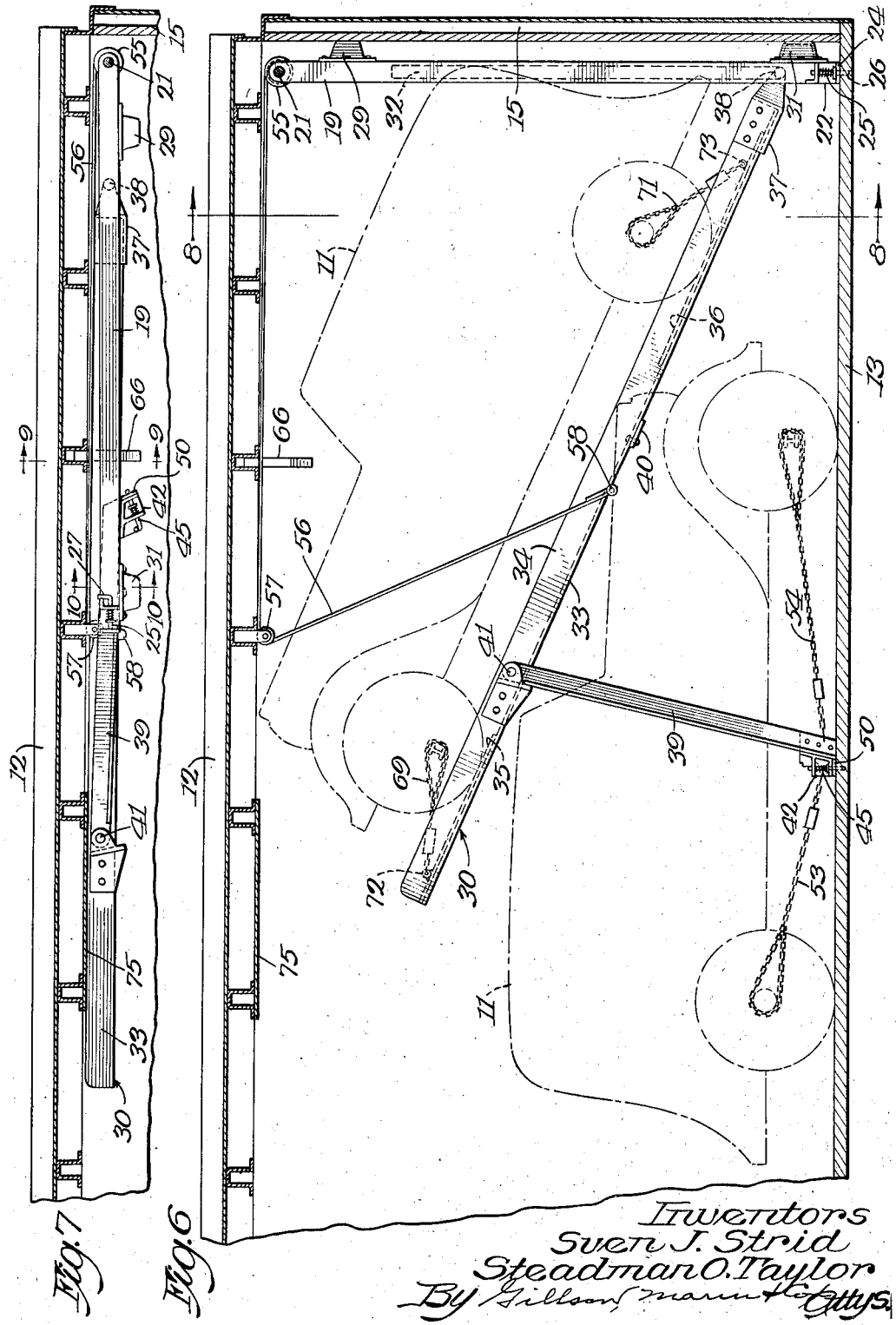
Inventors
Sven J. Strid
Steadman O. Taylor Aug. 23, 1938.  S. J. STRID ET AL  2,127,966
LOADING DEVICE
Filed June 24, 1935   3 Sheets-Sheet 3
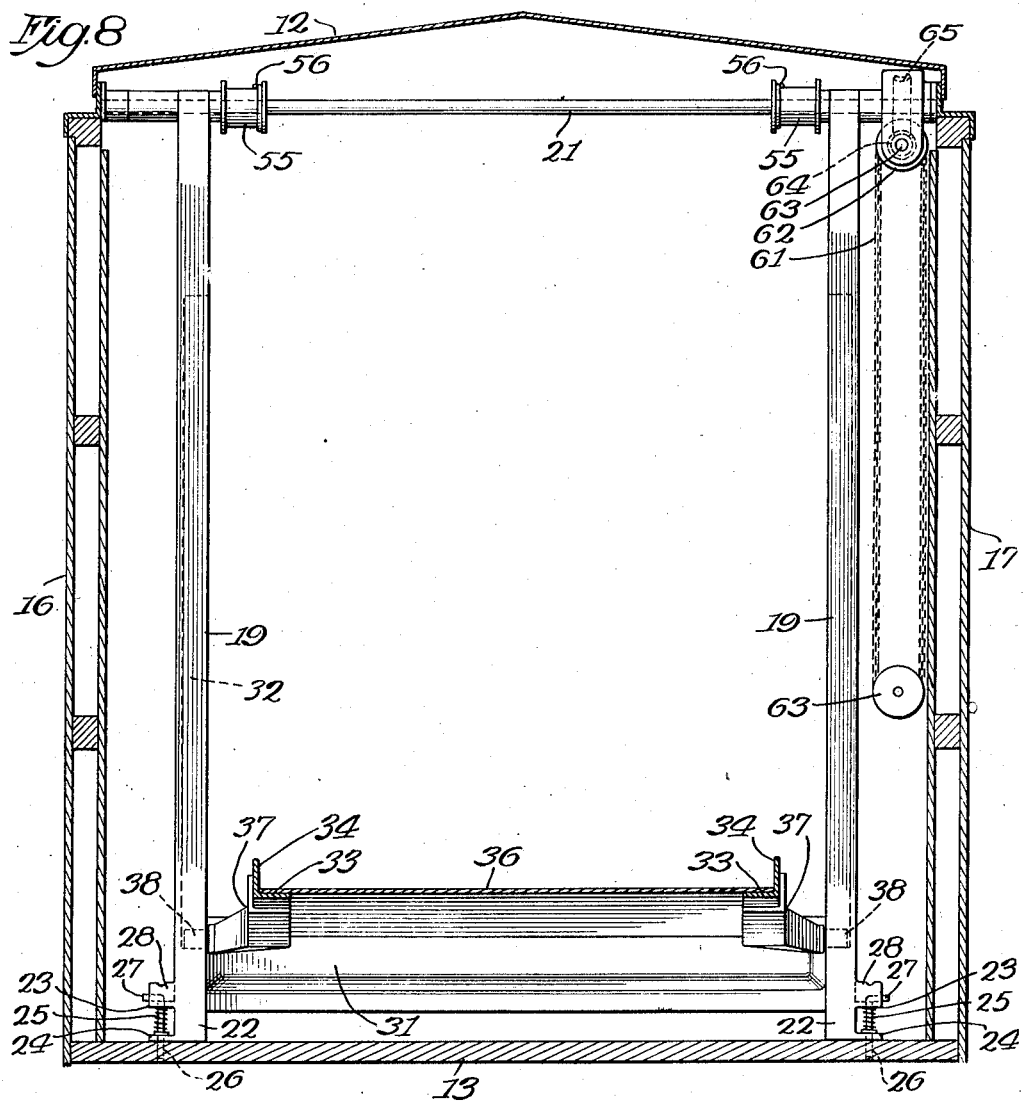
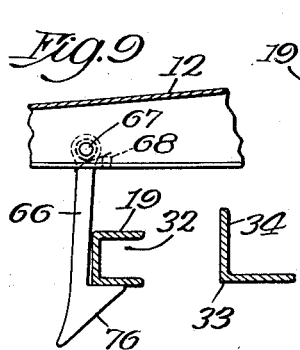
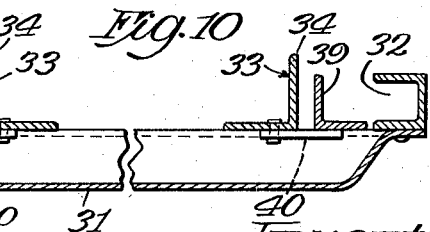
Inventors
Sven J. Strid
Steadman O. Taylor
By Gillson, Mann & Co.
Attys Patented Aug. 23, 1938

2,127,966

UNITED STATES PATENT OFFICE 2,127,966

LOADING DEVICE

Sven J. Strid, Chicago, Ill., and Steadman O. Taylor, St. Louis, Mo., assignors to Evans Products Company, Detroit, Mich., a corporation of Delaware Application June 24, 1935, Serial No. 28,126

6 Claims. (Cl. 105—368)

This invention relates to loading devices and more particularly to devices for securing automobiles and the like in position in transportation vehicles during shipment.

One of the objects of the invention is the provision of new and improved means for anchoring automobiles in position in freight cars and the like while the same are being transported and that has novel means for moving the devices to inoperative position.

Another object of the invention is the provision of new and improved shipping devices that are provided with novel means for positioning the automobile within the shipping conveyance and for securing the same therein.

A further object of the invention is the provision of a new and improved loading device that is inexpensive to manufacture, easily installed, efficient in use and which may be readily moved from operative to inoperative position and which is rugged and durable.

Other and further objects and advantages of the invention will appear from the following description taken in connection with the following drawings, in which:

Fig. 1 is a side elevation of a railway car showing the invention therein with the railway car shown more or less diagrammatically;

Fig. 2 is a horizontal section of a railway car showing the invention in position therein with an automobile secured in position thereon in dotted lines;

Fig. 3 is a horizontal section of a portion of a railway car and the lower portion of the supporting standards with an automobile in dotted lines on the floor of the car secured in position to the standards;

Fig. 4 is a section on the line 4—4 of Fig. 3;

Fig. 5 is a section on the line 5—5 of Fig. 4;

Fig. 6 is a vertical section of a portion of the car showing the invention in position therein;

Fig. 7 is a longitudinal vertical section of the upper portion of the car showing the shipping device in inoperative position beneath the roof of the car;

Fig. 8 is a transverse vertical section of the car and loading device;

Fig. 9 is a fragmentary view showing the latch for holding the shipping device in inoperative position, taken on the line 9—9 of Fig. 7; and Fig. 10 is a cross section of the device showing the same in folded position taken on the line 10—10 of Fig. 7.

Referring now to the drawings, the reference character 10 designates the conventional railway freight car in which automobiles or other vehicles 11 are adapted to be transported. Each car has a top wall or roof 12, a floor or bottom wall 13, end walls 14 and 15, and side walls 16 and 17. The side walls have doors 18 and 190 thereon. Preferably, these doors are offset so that the automobiles which rest on the floor may be more easily introduced into the car at each end thereof, as will presently appear.

Suitable means are provided for supporting an automobile at each end of the car in an inclined position under each of which is the front end of additional automobiles which rest on the floor of the car, as indicated in dotted lines in Fig. 1. The shipping device or mechanism for supporting an automobile in inclined position in the end of the car comprises a pair of standards 19 (see Figs. 6 and 8) which are pivotally connected at their upper ends to a shaft 21 adjacent to the roof of the car at the ends thereof. One of these shipping devices is placed at each end of the car, and, since they are duplicates, only one need be described.

The standards 19 have their lower ends provided with attaching feet 22, each of which is provided with laterally extending flanges 23 and 24 through which a spring-pressed bolt or pin 25 extends. The floor 13 of the car is provided with a recess 26 for receiving the lower end of the pin for holding the standards in lowered position, as indicated in dotted lines in Fig. 6 of the drawings. The pin 25 has a lateral extension 27 which is adapted to be turned for engaging a notch in an upstanding flange 28 for holding the pin in retracted position. The outer surfaces of the standards 19 may, if desired, be provided with buffer members 29 at their upper ends and with a connector 31, both of which are adapted to engage the ends of the car when the standards are in operative position, as shown more clearly in Fig. 6.

The standards are provided on their inner surfaces with slots 32, facing each other (see Figs. 6 and 10). The standards 19 may be channel bars having fillers at their upper and lower ends for forming shoulders or stops at the ends of the slots or channels 32.

A suitable platform 30 is provided on which the wheels of the inclined automobile are adapted to rest. This platform comprises the supporting members 33 at each side of the car. These members may be, and preferably are, L-shaped in cross section, as shown in Fig. 10, and are placed a sufficient distance apart that the wheels of the automobiles will rest between the upstanding flanges 34 of these members which will limit lateral movement of the wheels. The wheels are supported by the lateral flanges of the supporting members. The members are preferably connected at their upper ends by platform plates 35 and at their lower ends by platform plates 36 on which the wheels rest. These plates rest on the flanges 34 and are rigidly connected thereto. The lower ends of the supporting members 33 are provided with fittings 37 which have offset pintles 38 for engaging in the slots 32 of the standards 19, as shown more clearly in Fig. 2 of the drawings.

Suitable means are provided for supporting the inner end of the supporting members in elevated position. In the form of construction selected to illustrate one embodiment of the invention, a pair of foldable elements or supports 39 are employed for this purpose. These elements are pivotally connected by hinges 41 to the outer sides of the supporting members 33 at each side of the platform. Their lower portions are connected by the tie bar 50. These foldable elements may be turned alongside the supporting members 34 and held in such position by pivoted plates 40 which may be turned beneath the same (see Figs. 6 and 10).

The lower ends of the foldable elements are provided with feet 42, each of which has forwardly extending flanges 43 and 44 through which a spring-pressed pin 45 is adapted to slide. The floor 13 of the car is provided with a socket member 46 for each foot through which the pin 45 is adapted to extend, as clearly shown in Fig. 5 of the drawings. The lower end of the pin 45 is bent laterally, as at 47, to engage beneath the socket and for holding the foldable elements from moving vertically when they are secured in operative position. The upper end of the pin 45 is provided with a lateral extension 48 which is adapted to engage a shallow notch 49 in the flange 43 for holding the pin in locked position. Each foot 42 is also provided with a vertically extending flange 51 having a notch 52 therein whereby when the pin 45 is turned through 180° from the position shown in Fig. 5 and moved upwardly, the laterally extending portion 48 will engage in the notch 52 for holding the pin in inoperative position. The feet 42 are also provided with openings to which anchor chains 53 and 54 are adapted to be secured for anchoring an automobile in position on the floor of the car, as will presently appear.

Appropriate means are provided for elevating the automobile supporting members 33 and for folding the entire mechanism to a position beneath the roof of the car. As shown the shaft 21 is provided with a pair of drums 55 on which cables 56 are adapted to be wound. These cables extend inwardly along the roof of the car, and are trained over pulleys 57 and have their free ends attached, as at 58 (see Fig. 6), to the automobile supporting member 33. The points of attachment of the cables to the supporting members 33 are outwardly of a vertical transverse plane of the car, passing through the pulley 57, so that when cables are wound on the drum and the supporting members elevated, the latter will be moved forwardly as they are elevated, thereby rotating the standards 19 past dead center so that they will also be folded upwardly against the roof, as will presently appear.

Any suitable means may be provided for rotating the shaft 21 and the drums 55 thereon. As shown an endless chain 61 trained about pulleys 62 and 63 is employed for that purpose. The shaft 63 on which the pulley 62 is secured is provided with a worm 64 (see Fig. 8) that engages a gear 65 fast on the shaft 21 whereby when the pulley 62 is rotated, the worm 64 will rotate the gear 65 and with it the shaft 21 and the drums 55. The pitch of the worm on the shaft 63 is such that it will hold the gear 65 in any adjusted position.

Suitable means are provided for holding the shipping device in folded position beneath the roof of the car when not in use. Any appropriate mechanism may be employed for this purpose. As shown, more particularly in Fig. 9, a hook 66 pivoted as at 67 to the roof of the car at each side thereof is provided for this purpose. The pivot 67 may be and preferably is a spring hinge whereby the hook will be urged inwardly against a stop 68. These hooks are adapted to engage beneath the standards 19 for supporting the same and with them the entire mechanism when the same is in inoperative position.

The automobile when in position on the platform 30, as shown in dotted lines in Fig. 6, is held by suitable anchor chains 69 and 71 which may extend about the front and rear axles and be secured to eye members 72 and 73 rigidly connected to the platform. Other fastening means may be employed, if desired.

When it is desired to employ the device for loading automobiles and securing the same in a freight car, the loading device is lowered from the position shown in Fig. 7 by first releasing the hooks or catches 66 from the standards 19 after which the chain 61 is operated until the platform 33 is in its lowermost position with the inner end portion of the platform on the floor.

After the pins 25 are in position in the sockets 26, the automobile is introduced through the door of the car and placed in position on the platform 33 where it is secured or anchored in any suitable manner, as by means of the chains 69 and 71. The chain 61 is then operated for elevating the platform to the position shown in Fig. 6. The latches 40 are released and the foldable elements permitted to swing by gravity downwardly, and when in the proper position, the spring-pressed bolts 45 are turned to position to pass through the slots in the sockets 46 and then turned to cause the laterally extending ends 47 to engage beneath the lower portions of the sockets for holding the supporting members in adjusted position. The lower automobile is then introduced through the door of the freight car and is anchored in position by a suitable means, as the chains 53 and 54 which are so connected to the axles or other parts of the automobile as to extend diagonally outwardly therefrom to the feet 42 on the supporting members 39. Other anchoring devices may also be employed for assisting in securing the automobile in position on the shipping device and in the railway car.

When it is desired to store the shipping device adjacent to the roof of the car, after the platform has been lowered for removing the automobile therefrom, and the foldable elements 39 latched in folded position and the pins 25 released, the chain 61 is operated for winding the cables 56. Upon continual upward movement of the platform, the inner end will engage the roof or a plate 75 secured beneath the roof and, due to the fact that the cables 56 are arranged at an acute angle to the platform when the device is in operative position, the platform will be drawn inwardly, which will cause the standards 19 to fold inwardly into the position shown in Fig. 7. As the standards 19 fold beneath the platform, they wall engage the inclined surfaces 76 of the hooks 66 and force them laterally. On further upward movement of the standards, the hooks 66 will snap beneath the same due to the spring hinges of these hooks. The cross member 31 on the standards will support the platform members and foldable elements 39, as shown in Fig. 10 of the drawings.

We claim as our invention:—

1. In a loading device for anchoring an automobile in a freight car during shipment, a pair of standards each having a slot extending from adjacent one end toward the opposite end thereof, a platform, means slidable in said slots for movably connecting one end of said platform to said standards, foldable supporting members connected to the opposite end portion of said platform, means for pivotally connecting said standards to the upper portion of a car adjacent one end thereof, winding drums at the pivoted ends of said standards, and cables secured to said drums and to an intermediate portion of said platform between said standards and said supporting members.

2. In a railway car for transporting automobiles, standards adjacent one end thereof pivoted to the upper portion of said car and movable to a position adjacent to and parallel with the end wall of the car, each standard comprising a one-piece rigid structure, means for detachably connecting said standards to the floor of said car, a platform slidably connected at its outer end to said standards and supported thereon, said platform engaging beneath the wheels of an automobile for supporting the same, foldable supports for supporting the inner end of said platform, and means for folding said standards and platform longitudinally of the car into a position beneath the car roof.

3. In a railway car, a pair of supporting standards, each standard consisting of a single bar, means for pivotally connecting said standards at one end to the car adjacent the roof to swing longitudinally of the car, said standards extending vertically when in operative position, means for detachably connecting the lower ends of said standards to said floor adjacent one end of the car, automobile supporting members extending longitudinally of the car and having their outer ends slidably engaging said standards and supported thereon, each of said members being adapted to support the wheels at one side of an automobile, means for supporting the inner ends of said members in elevated position, and means whereby said standards and members may be folded longitudinally of the car to a position adjacent to the roof of said car.

4. In a shipping conveyance having a floor, roof and an end wall, a pair of upright standards rigid from end to end and extending parallel with, and in proximity to, an end wall of said conveyance and having slots in their intermediate portion, means for pivotally connecting the upper ends of said standards to said conveyance adjacent to the roof at one end of the car, means for rigidly maintaining each of said uprights in substantially vertical position, a pair of automobile supporting members rigidly connected together, each having a pin on its outer end engaging the slot on the corresponding standard, foldable legs for supporting the inner ends of said members in elevated position, means for retaining said legs in a folded position against said members, and means for elevating said members and simultaneously moving the same forwardly for folding said standards and members adjacent to the roof of said conveyance.

5. In a shipping conveyance, upright standards each rigid from end to end and hinged to said conveyance adjacent the roof of said conveyance adjacent to the end wall thereof and extending along the end wall while in operation, means for holding said standards rigidly in upright position, automobile supporting members each supporting the front and rear wheels at one side of the automobile and having their outer ends slidably connected to said standards and supported thereon, means for supporting the inner ends of said members in elevated position, and means for moving said standards and members upwardly and longitudinally of the conveyance to an elevated, folded position.

6. In a railway car, a shaft at one end of the car adjacent to the roof, a pair of standards pivoted to said shaft and movable to a vertical operative position, each standard consisting of a one-piece rigid structure, means for detachably attaching the lower ends of said standards to the floor of said car, drums on said shaft, a platform slidably connected at its outer end portion to said standards and supported thereon, supports for the inner end of said platform, pulleys secured to the upper portion of the car above said supports, and cables secured to said drums and said platform between said standards and supports and extending over said pulleys for moving said standards and platform to operative position.

SVEN J. STRID.
STEADMAN O. TAYLOR.